Dec. 20, 1966  H. JENKINS  3,292,260

ORTHODONTIC BRACKETS

Filed Jan. 20, 1966  2 Sheets-Sheet 1

INVENTOR
HARVEY JENKINS

BY *Featherstonhaugh & Co.*
ATTORNEYS

United States Patent Office 3,292,260
Patented Dec. 20, 1966

3,292,260
ORTHODONTIC BRACKETS
Harvey Jenkins, 200 St. Clair St. W., Suite 318,
Toronto 7, Ontario, Canada
Filed Jan. 20, 1966, Ser. No. 524,985
4 Claims. (Cl. 32—14)

This invention relates to an orthodontic bracket, and is a continuation-in-part of application Serial No. 296,659, filed July 22, 1963, now abandoned.

Standard orthodontic practice in the straightening of teeth is to band the teeth, mount brackets on the bands, anchor an arch wire to rigid molars and attach a series of ligatures between the teeth and the arch wire to move the teeth with respect to the arch wire. The brackets have slots and like formations that cooperate with the arch wire to control the corrective action, and in most techniques the arch wire binds with the slots in the brackets to restrict tooth movement in at least one direction as correction takes place, with the result that the wire itself becomes stressed and exerts a non-corrective force on the tooth. In other techniques, the bracket and the wire exert a turning force on the tooth which is in a corrective direction.

Thus, in some cases the wire exerts an unwanted force against the tooth as the tooth is corrected, with the result that a further fault may be introduced, or the correcting force is applied as a result of the cooperation of the resilience of the wire and its cooperation with the bracket. In the first case, the result of the wire applied forces is undesired. In the second case, frequent rewiring is necessary as correction takes place because correction can only be done by increments. It is not uncommon to have to change the wire between fifteen and twenty times to achieve a desired corrective result.

This invention overcomes these disadvantages of the prior art by providing a bracket having a fulcrum point for engagement with the arch wire and means for permitting movement of the bracket and hence the tooth to which the bracket is attached about three mutually perpendicular axes, one of which aligns with the axis of the wire. The technique of using the bracket is, as soon as possible, to get one point on the tooth in the perfect dental arch and then by means of ligatures pull the tooth about this point as a pivot point until it aligns with the dental arch. As it does so, no forces other than the corrective ones of the ligatures applied by the orthodontist act on the tooth. Thus, the orthodontist has complete control of the corrective action without any interference from unwanted torques applied by the wire through the bracket as correction takes place.

Generally speaking, a bracket according to this invention has two bars. The first bar is formed with a notch through which an orthodontic arch wire can pass in use and is adapted to provide a base for rotation at the notch. The second bar aligns substantially with the longitudinal axis of the tooth upon which the bracket is mounted in use. The notch is adapted to permit the bracket to rotate about three mutually perpendicular axes. The second bar is adapted for free engagement with the dental arch.

In use, the bracket is wired to the arch wire at the notch for rotational movement, as indicated above, and ligatures are attached to exert the desired corrective force on the tooth without stressing the arch wire in an undesired and uncontrolled way as a result of interaction of the brackets and the arch wire.

The invention will be clearly understood after reference to the following detailed specification read in conjunction with the drawings.

Figure 1:
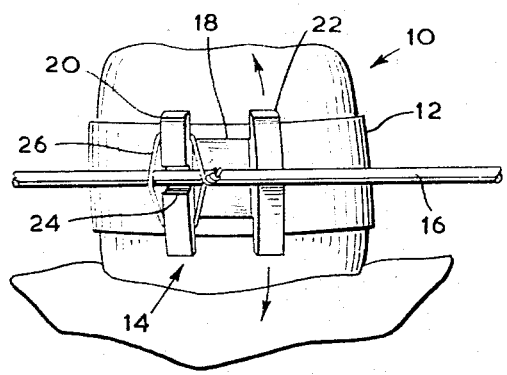
FIGURE 1 is a view of a banded tooth having a bracket according to this invention attached thereto, showing its cooperation with a portion of an arch wire.

Referring to the drawings, the numeral 10 refers to a tooth having an orthodontic band 12 therearound. A bracket, generally indicated by the numeral 14, is mounted on the band 12 and cooperates with a dental arch, a portion of which is indicated by the numeral 16 and which is anchored according to standard practice.

The bracket 14 consists essentially of a base 18 from which extends a first bar 20 and a second guide bar 22. The bar 20 is formed with a notch 24 that is adapted to admit the arch wire 16 and to provide a point about which the bracket, and hence the tooth to which it is attached, can rotate about three mutually perpendicular axes, one of which coincides with the axis of the dental wire 16.

The guide bar 22 is adapted to limit movement of the tooth towards the arch wire and slide with respect to the arch wire 16 when in contact with the arch wire and has a height above the base of the bracket substantially the same as the height of the bottom of the notch 24.

In use, the notch 24 fits over the arch wire 16 and is wired into position by means of the wire 26. Notch 24 has a width that will permit the wired bracket and hence the tooth to rotate about an axis at right angles to the axis of the wire 16, as indicated by the arrows in FIGURE 1, through an arc of about 35°. This arc covers all commonly met misalignments in this plane of rotation.

Figure 2:
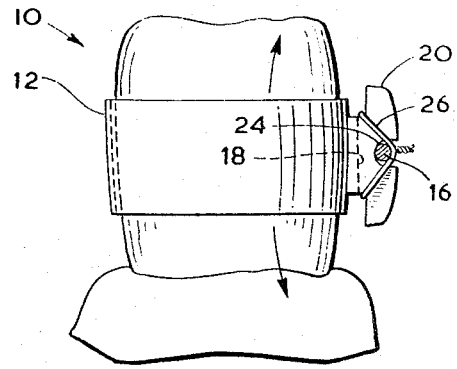
FIGURE 2 is an end view of FIGURE 1.

It will also be apparent that the bracket, and hence the tooth to which it is mounted, can, until bar 22 engages the arch wire, be rotated about an axis that is coincident with the axis of the arch wire, as indicated by the arrows in FIGURE 2. At the same time, the bracket can be rotated about the notch 24 in another axis mutually perpendicular to the first two mentioned axes, as indicated by the arrows in FIGURE 3.

Thus, the bracket and the tooth are free for movement about three mutually perpendicular axes for the correction of the tooth without using a bending force derived from the wire 16.

Figure 4:
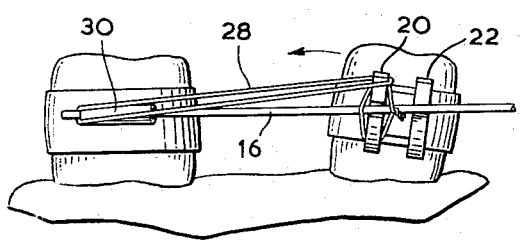
FIGURE 4 illustrates the means of applying a ligature to achieve the rotation illustrated in FIGURE 1.

In FIGURE 4 there is illustrated a means for applying tension to move the tooth about an axis that is perpendicular to the axis of the dental arch. It consists of an elastic band 28 stretched around an end of the bar 20 and around the tube 30 that retains the free end of the dental arch 16. It will be noted that as correction takes place in this direction, no bending forces are applied to the dental arch as a result of the binding of spaced apart elements of the bracket that grip the dental arch. In the event that the guide surface of the guide bar 22 is touching the dental arch, it is merely a sliding contact that it has with the dental arch. There is, therefore, no tendency to bend the dental arch.

It will be noted from an examination of FIGURE 2 that the tooth is free to pivot about an axis aligned with the axis of the dental arch. Here again, there is no possibility of a bending force on the wire. Force to achieve correction of this type is derived from an elastic or the like between the tooth and a notch formed in the arch wire according to standard practice.

Figure 3:
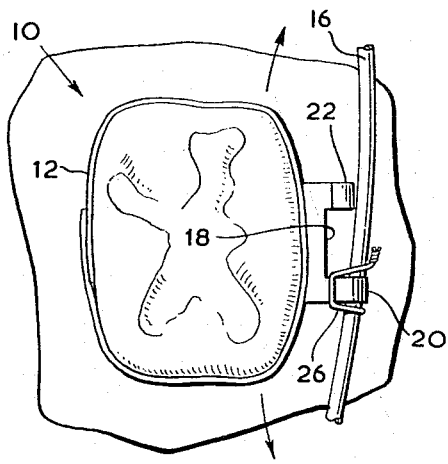
FIGURE 3 is a plan view of FIGURE 1.
Figure 5:
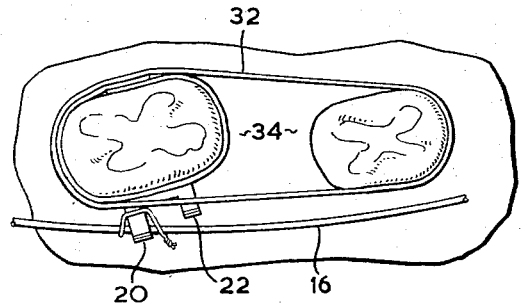
FIGURE 5 is an illustration showing a ligature for achieving the correction illustrated in FIGURE 3.

In FIGURE 5 there is shown a means for exerting a tension for turning the tooth about a vertical axis, perpendicular to the axis of the dental arch, which consists essentially of applying an elastic band 32 at a height above the notch 34 between adjacent teeth. Movement, in the case of FIGURE 5, is about more than one axis and the movement about the axis shown in FIGURE 3 is limited by contact of the guide bar 22 with the arch 16.

The methods for applying tension are capable of variation and will be apparent to those skilled in the art. The important thing about the use of this technique is that the tooth is pivoted about a single point on the dental arch and the only forces applied to it are those applied by the orthodontist with his elastic bands or the like. There are no dangerous and uncontrolled reactionary forces caused by distortion of the wire as it is deformed by the bracket. The bracket merely pivots with respect to the arch wire under forces applied by the orthodontist and the tooth is free to rotate in any corrective direction under the sole influence of the tensioning bands.

Figure 6:
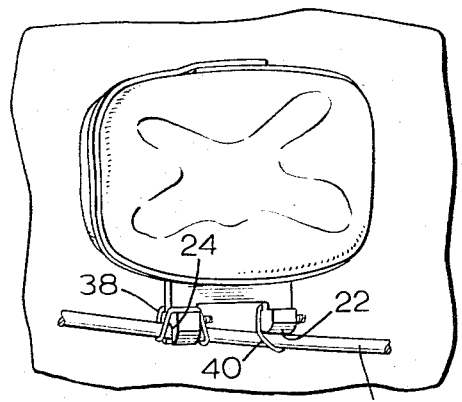
FIGURE 6 is a plan view of a banded tooth with a bracket of this invention.
Figure 7:
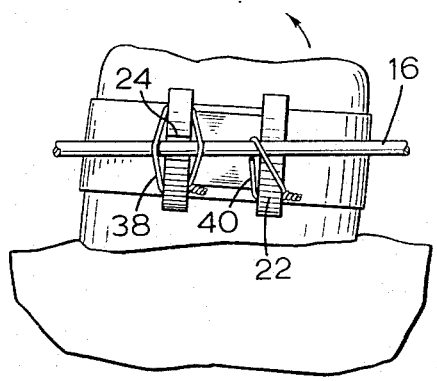
FIGURE 7 is a side view of the tooth shown in FIGURE 6.

The foregoing illustrations of use of the bracket show its versatility and unusual uses of the bracket. The most common way of using the bracket will be to attach a fulcrum ligature to the arch wire to secure one point of the bracket on the dental arch and then to apply a power ligature between the arch wire 16 and one of the shoulders of the guide bar 22 to rotate the bracket and the tooth to which it is attached with respect to the arch wire. Thus, FIGURES 6 and 7 illustrate a misaligned tooth. The bracket of this invention can be used to align the tooth by first attaching a fulcrum ligature 38 to seat the arch wire at the bottom of the notch 24 and then by attaching a power ligature 40 between the underside of the lower shoulder of the guide bar 22 and the arch wire. As described above, the bracket is free to turn with respect to the arch wire 16 at the seat at the bottom of the notch 24 as the tension of the power ligature 40 acts on the bracket, and hence the tooth, to turn the tooth with respect to the arch wire. As turning takes place, there is inevitably a certain amount of sliding of the bracket longitudinally of the arch wire and the tooth moves slightly rearwardly with respect to the arch wire as it rotates with respect to the arch wire. As indicated above, a common and suitable type of ligature wire for the ligatures 38 and 40 is a soft ligature wire having a diameter of about .009 inch. The arch wire is of a hard, more springy nature and preferably has a diameter of about .016 inch. The arch wire is of standard specification as used in the light wire technique.

If it is desired to move the tooth illustrated in FIGURE 6 rearwardly to the left as well as straighten it, one would rotate it as described above past the vertical position to assume an inclination opposite to the illustrated inclination and then bring it back into the vertical position by attaching a power ligature from the shoulder under the upper end of the guide bar 22 to the arch wire 16. During each of the rotational movements achieved with the power ligature, a certain amount of sliding longitudinally of the arch wire results and the tooth is moved rearwardly.

In the illustration of FIGURE 6 the guide surface of guide bar 22 is in contact with the arch wire. However, it may not be in the beginning, and if it were not, correction could be applied to bring it into contact with the arch wire by various ones of the techniques illustrated or by other power-applying techniques which will be apparent and may be devised by an orthodontist.

It is not intended that the invention should be limited by the power-applying technique. Important features of the invention are the rigid guide bar and the seating bar with a seat formed to receive an arch wire at the seat where it is tied to the arch wire a sufficient amount to achieve the correction described with a guide surface adapted to cooperate with the arch wire to control correction.

There must be means for ligating the bracket to the seat to provide for the rotational movement described and at the same time permit a certain amount of sliding longitudinally of the bracket as described, and there must be means for applying a power ligature to the arch wire to obtain rotational movement of the bracket about the seat. The slot 24, the bottom of which forms the seat for the arch wire, must be sufficiently wider than the diameter of the arch wire to permit the bracket to pivot with respect to the arch wire about an axis through the arch wire and perpendicular to the bottom of the slot of preferably about 30°. However, as indicated above, many misalignments can be corrected with less.

In the application and figures, the action of ligatures and the arch are considered on one bracket on one tooth.

During treatment of a patient, 28 brackets are used on 28 teeth, set in a complex relation to each other and to the jaws, which are further inter-related and changing during treatment.

Each operation in treatment then consists of 28 individual yet inter-related adjustments of ligatures to achieve a complex co-ordinated movement of teeth in both position and inclination.

The simple mechanism of adjustment permitted by this individual bracket in 3 planes of space is thus very necessary to the success of the more complex total operation.

What I claim as my invention is:

1. In orthodontic apparatus for use in connecting tooth position, and including a tooth band, a rigid metal bracket on said tooth band, arch wire, ligature wire to ligate the bracket to the arch wire in the application of corrective forces, the improvement comprising said rigid metal bracket having a base, a seating bar on said base, a guide bar on said base, said guide bar having a smooth elongated guide surface, said seating bar having a seat for the arch wire, said seat comprising the bottom of an open slot in said seating bar to receive the arch wire, the width of said slot being greater than the width of the arch wire, and said seat being adapted to turn with respect to said arch wire whereby said bracket can turn through a corrective arc of between 10° and 35° with respect to the arch wire when said seat cooperates with the arch wire, said guide surface having an extent adapted to engage with the arch wire as it moves through said corrective arc, said elongated guide surface of said guide bar extending substantially at right angles to said slot in said seating bar, the height of said seat above said base being substantially the same as the height of said guide surface above said base, first anchor means for ligature wire to ligate the arch wire to said seat, and second anchor means for ligature wire to ligate said bracket to the arch wire to rotate it about said seat.

2. In orthodontic apparatus for use in connecting tooth position, and including a tooth band, a rigid metal bracket on said tooth band, arch wire, ligature wire to ligate the bracket to the arch wire in the application of corrective forces, the improvement comprising the limitation claimed in claim 1, in which said second anchor means comprises shoulders underlying the two extremities of said guide surface of said guide bar.

3. In orthodontic apparatus for use in connecting tooth position, and including a tooth band, a rigid metal bracket on said tooth band, arch wire, ligature wire to ligate the bracket to the arch wire in the application of corrective forces, the improvement comprising the limitations claimed in claim 1, in which said seating bar comprises an elongated bar, and said first anchor means comprises shoulders underlying the two extremities thereof.

4. In orthodontic apparatus for use in connecting tooth position, and including a tooth band, a rigid metal bracket on said tooth band, arch wire, ligature wire to ligate the bracket to the arch wire in the application of corrective forces, the improvement comprising the limitations claimed in claim 1, in which said corrective angle is about 20°.

References Cited by the Examiner

UNITED STATES PATENTS

| | | | |
|---|---|---|---|
| 1,481,861 | 1/1924 | Eaton | 32—14 |
| 1,553,797 | 9/1925 | Angle | 32—14 |
| 2,767,469 | 10/1956 | Gladstone | 32—14 |

OTHER REFERENCES

Rocky Mountain Metal Products Co. catalog for 1961. Copies of advertising pages 13 and 14 relied upon.

(a) Universal Bracket, catalog order No. A-221, pg. 13.

(b) Lewis Upswept Bracket, catalog order No. A-325, pg. 14.

RICHARD A. GAUDET, Primary Examiner.

J. W. HINEY, JR., Assistant Examiner.